(12) United States Patent
Tachikawa

(10) Patent No.: US 7,518,595 B2
(45) Date of Patent: Apr. 14, 2009

(54) POINTING DEVICE CONTROL APPARATUS AND METHOD, ELECTRONIC INSTRUMENT, AND COMPUTER PROGRAM FOR THE POINTING DEVICE CONTROL APPARATUS

(75) Inventor: Takashi Tachikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 10/873,458

(22) Filed: Jun. 23, 2004

(65) Prior Publication Data

US 2004/0263472 A1 Dec. 30, 2004

(30) Foreign Application Priority Data

Jun. 25, 2003 (JP) .............................. 2003-181325

(51) Int. Cl.
*G06F 3/033* (2006.01)
*G09G 5/08* (2006.01)

(52) U.S. Cl. ....................................... 345/156; 345/163

(58) Field of Classification Search ................. 345/159, 345/163, 173, 157; 715/856, 857, 858
See application file for complete search history.

(56) References Cited

U.S. PATENT DOCUMENTS 5,877,748 A * 3/1999 Redlich ....................... 345/163
6,014,127 A * 1/2000 Blomqvist .................. 715/856
6,587,131 B1 * 7/2003 Nakai et al. .................. 715/857
6,750,877 B2 * 6/2004 Rosenberg et al. ........... 345/157
7,092,495 B2 * 8/2006 Kraft et al. ................ 379/88.11
7,109,975 B2 * 9/2006 Fedorak et al. .............. 345/173

FOREIGN PATENT DOCUMENTS

| JP | 5-265649 A | 10/1993 |
| JP | 9-244808 A | 9/1997 |
| JP | 10-154038 | 6/1998 |
| JP | 10-154038 A | 6/1998 |
| JP | 2001-160336 A | 6/2001 |
| JP | 2003-76489 A | 3/2003 |
| JP | 2003-173239 A | 6/2003 |

* cited by examiner

*Primary Examiner*—Kevin M Nguyen
(74) *Attorney, Agent, or Firm*—Sughrue Mion, PLLC

(57) ABSTRACT

A control unit 203 controls a position of a pointer to be displayed on a display 208A in response to an operation of a pointing device (PD) 11 by the user. In this case, the control unit 203 detects actual operation directions 50 and 50' of the PD 11 by means of a sensing module 13. Next, the control unit 203 determines whether or not the actual operation directions 50 and 50' are included in an adjustment region 70, which is preset with a movable range of the PD 11 as an object to be adjusted. Then, when it is determined that the actual operation directions are included in the adjustment region 70, the control unit 203 adjusts information indicating the actual operation directions to information indicating a direction 60 so predetermined as to correspond to the adjustment region in such a way that a moving direction of the pointer displayed on the display 208A in response to the actual operation directions is changed to the predetermined direction.

22 Claims, 7 Drawing Sheets

POINTING DEVICE CONTROL APPARATUS AND METHOD, ELECTRONIC INSTRUMENT, AND COMPUTER PROGRAM FOR THE POINTING DEVICE CONTROL APPARATUS

FIELD OF THE INVENTION

The present invention relates to a technical field of a pointing device for entering an operation of a user to an electronic instrument.

BACKGROUND OF THE INVENTION

Heretofore, what is called a pointing device has been used for a cellular phone, a PDA (personal digital assistance), a notebook personal computer (hereinafter, referred to as a notebook PC), a game machine or the like. As one of input devices, the pointing device has a function to move a display position of an object to be controlled (a pointer, a cursor or the like) on a display screen in response to operating force to an arbitrary direction by a user (hereinafter, also referred to as "an operator" in some cases). As a generally-used pointing device, an analog pointing device such as a mouse, a track ball and a joystick has been widely used.

In control of such a conventional pointing device, it is common to calculate a relative operating position with respect to a certain reference point by use of a two-dimensional coordinate system or polar coordinate system of an operating direction $\alpha$ and an amount of operation $\beta$.

FIG. 7 is a view showing a relationship between the operating direction and the amount of operation in a conventional pointing device.

More specifically, this drawing shows a relationship between an operating direction and an amount of operation in a joystick type pointing device as an object, which designates a reference point O as a center and performs the control based on an operating direction and an amount of operation from the reference point O. In this drawing, in which the reference point in the system of coordinates is defined as (0, 0) and the operating position in the system of coordinates as A(x, y). In this case, each of x and y takes on any value of a positive value, a negative value and zero. Then, the operating direction $\alpha$ is determined by a ratio of the x and the y and by a combination of the x and they, each of which takes on any value of a positive value, a negative value and zero. Note that the case where both of the x and the y are zero is excluded.

Here, when the operating direction is defined as an angle of measure $\alpha$ in radians ($-\pi \leq \alpha \leq \pi$), the operating direction $\alpha$ in the pointing device of the above-described conventional system can be uniquely determined as shown below. Specifically, equations can be represented as:

(when $x=0$, $y>0$): $\alpha=\pi/2$;

(when $x=0$, $y<0$): $\alpha=-\pi/2$;

(when $x>0$, $y=0$): $\alpha=0$;

(other than when $x>0$, $y=0$): $\alpha=\tan^{-1}(y/x)$;

(when $x<0$, $y=0$): $\alpha=\pi$;

(when $x<0$, $y>0$): $\alpha=\pi+\tan^{-1}(y/x)$; and (when $x<0$, $y<0$): $\alpha=-\pi+\tan^{-1}(y/x)$.

Moreover, the amount of operation $\beta$ in this case can be represented as:

$\beta=(x^2+y^2)^{0.5}$

Furthermore, arithmetic operations of trigonometric functions are included in this calculation, and therefore, a translation table is used in order to increase processing speed in some cases.

In the control of the conventional pointing device, as described above, it is common to use the relative operating position (x, y) with respect to the reference point O or parameters such as the operating direction $\alpha$ and the amount of operation $\beta$. Furthermore, the moving speed of the object to be operated (the pointer, the cursor or the like), which is displayed on a display 208A, is changed in response to a magnitude of the amount of operation $\beta$ obtained in the procedure as described above. Here, examples of relationships between the amounts of operation $\beta$ and the moving speeds V are shown in FIGS. 8A to 8G.

FIGS. 8A to 8G are explanatory views showing the relationships between the amounts of operation and operating speeds in the conventional pointing devices.

As shown in these drawings, in the conventional pointing device, there are examples such as:

Example of linearly increasing the speed V in response to the amount of operation $\beta$ (FIG. 8A);

Examples in each of which a plurality of increasing gradients of the speed V are present (FIGS. 8B to 8D);

Examples of non-linear relationship between the amount of operation $\beta$ and the speed V (FIGS. 8E and 8F); and Example of the speed V constant with respect to the amount of operation $\beta$ (FIG. 8G).

With regard to these analog pointing devices, it is common to choose an object to be operated (the pointer, the cursor or the like), which is small on the display screen, as a utilization mode thereof. Specifically, in the utilization mode of the conventional pointing device, a delicate operation such as drawing a picture or a character is required for the pointing device in many cases, and accordingly, resolution thereof in the moving direction is relatively high in many cases. However, that the high resolution causes a slight directional shift to appear in the moving direction as it is. For this reason, in the case of moving the object to be controlled, such as the pointer, to an expected position on the display, the user of such a pointing device tends to slightly shift or stagger the object to be controlled (or the operating position). Hence, it is very frequent that the operator cannot be satisfied with an operation feeling of the conventional pointing device.

Moreover, the tendency of the operating position towards being shifted due to the above-described resolution is particularly evident in a portable electronic instrument such as the cellular phone and the compact PDA, for which the pointing device itself is required to be miniaturized.

Specifically, in the portable electronic instrument (a portable communications terminal device such as the cellular phone, and an information processing apparatus such as the PDA), in general, a casing thereof is compact. Accordingly, on such a portable electronic instrument, a device made in consideration of a size and motion of a hand of the user, that is what-is-called a full-scaled keyboard is difficult to mount. Therefore, in the portable electronic instrument, the pointing device plays an important role as a man-machine interface between the user and the electronic instrument. However, under such circumstances, in the actual portable electronic instrument, it is difficult to ensure a sufficient area for mounting the pointing device due to limitations of a size of the casing.

Hence, the portable electronic instrument under such circumstances has a problem that the portable electronic-instrument cannot give a sufficiently comfortable operation feeling to the user.

In this connection, for example, in Japanese Patent Laid-Open No. H5 (1993)-265649 (hereinafter, referred to as Patent Document 1), a pointing device which adjusts such a shift is disclosed.

In this Patent Document 1, first, an ARCTAN value of the pointing device is calculated by means of outputs of two sensors. Then, in Patent Document 1, actual outputs of the sensors are adjusted to approximate values thereto so that the ARCTAN value can be 0, 45, 90, 135, 180, 225 and 270. In such a way, in Patent Document 1, a configuration is formed in which data can be obtained as a displacement in a specific direction even if the pointing device is roughly operated.

According to such an adjustment method, it is possible to realize the adjustment by a relatively simple control system. However, the operator who operates the pointing device has a habit inherent in him/herself. For this reason, only in accordance with such an adjustment method, there is no other way but the operator conforms his/her operation with this adjustment method, causing a problem of low adaptability in some cases.

Accordingly, for example, in Japanese Patent Laid-Open No. H10 (1998)-154038 (hereinafter, referred to as Patent Document 2), disclosed is a pointing input device which stores a shift from a reference direction as personal data and adjusts a shift caused the habit inherent in the operator.

However, in the case of such adjustment control which stores the personal data and performs the adjustment as in Patent Document 2, the control system sometimes becomes complicated.

SUMMARY OF THE INVENTION

In this connection, it is an object of the present invention to improve operability for an object to be controlled, which is to be operated, even in a mounting environment where it is difficult to ensure a sufficient mounting area for a pointing device.

In order to achieve the foregoing object, the present invention is a control apparatus for controlling a position of an object to be controlled, the object being to be displayed on a display (208A) in response to an operation of a pointing device (11) by a user, comprising:

setting means (31, 32, 34 and 203) for setting an adjustment region (70 to 75 and 80) and a predetermined direction (60 to 65) corresponding to the adjustment region while designating a movable range of the pointing device as an object for the adjustment, the movable range being treated as information based on a predetermined coordinate system in the control apparatus; and adjustment control means (35 and 203) for, when an actual operation direction (50 and 50') of the pointing device operated by the user is included in the adjustment region set by said setting means, adjusting information indicating the actual operation direction to information indicating the predetermined direction (60 to 65), which is set by the setting means so as to correspond to the adjustment region (70 to 75 and 80), in such a way that a moving direction of the object, the object being to be displayed on the display in response to the actual operation direction, to be controlled is changed to the predetermined direction.

In a preferred embodiment, the pointing device control apparatus having the above-described configuration further comprises selection means (32) capable of choosing an adjustment region, which the user wishes to employ for adjusting the actual operation direction, out of previously prepared plural types of the adjustment regions.

Moreover, for example, it is recommended that the pointing device control apparatus further comprises synthesis means (34) for synthesizing at least two types of the adjustment regions, the regions being selected by the user out of the previously prepared plural types of adjustment regions, as the adjustment region, the region being to be employed for adjusting the actual operation direction.

Furthermore, for example, it is recommended that the adjustment control means (S704 and S705) adjusts the information indicating the actual operation direction in order to adjust the actual operation direction to the predetermined direction when any of an amount of operation of the pointing device and an operating speed thereof is larger than a predetermined threshold value (Th).

Furthermore, for example, it is recommended that a plurality of the adjustment regions are set with a center position (0) of the movable range of the pointing device designated as a reference.

Furthermore, in the above-described case, it is recommended that the plurality of adjustment regions are made of at least two types of the adjustment regions (73 and 74) different in size from each other.

Alternatively, when the plurality of adjustment regions are set in the movable range of the pointing device, it is recommended that the movable range includes an area where any adjustment region is not set, the included region being set with the center position taken as the reference. Then, in this case, the at least two types of adjustment regions can also be configured to be different from each other in a longitudinal direction and in a lateral direction in the movable range of the pointing device.

Note that the foregoing object is achieved also by a method corresponding to the pointing device control apparatus having each configuration described above.

Moreover, the foregoing object is achieved also by an electronic instrument (a cellular phone, a PDA or the like) comprising the pointing device control apparatus having each configuration described above.

Furthermore, the foregoing object is achieved also by a software program realizing the pointing device control apparatus having each configuration described above and the pointing device control method by a computer, and a computer-readable recording medium storing the software program therein.

Other features and advantages of the present invention will be apparent form the following description taken in conjunction with the accompanying drawings, in which like reference numerals designate the same or similar parts through the figures thereof.

BRIEF DESCRIPTION OF THE DRAWINGS

The above and other objects, features and advantages of the present invention will become more apparent from the following detailed description when taken in conjunction with the accompanying drawings, wherein.

DETAILED DESCRIPTION OF THE PREFERRED EMBODIMENTS

Preferred embodiments of the present invention will now be described in detail with reference to the accompanying drawings.

An embodiment in which a pointing device control apparatus phone as atypical electronic instrument will be described below in detail with reference to the drawings.

Figure 1:
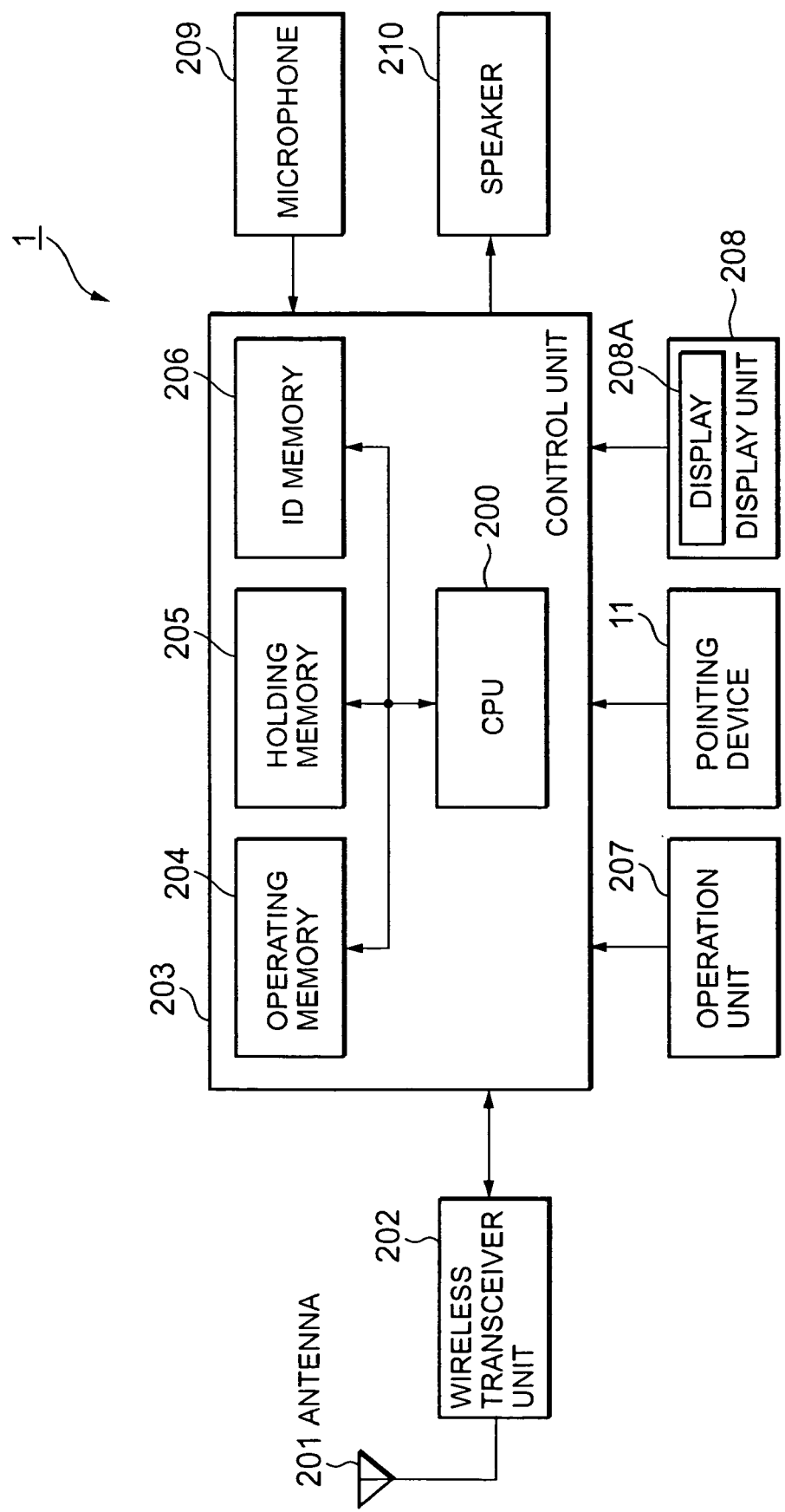
FIG. 1 is a block diagram illustrating a configuration of a cellular phone 1 to which the present invention is applicable.

FIG. 1 is a block diagram illustrating a configuration of a cellular phone 1 to which the present invention is applicable.

In this embodiment, the cellular phone 1 includes a pointing device 11, an antenna 201, a wireless transceiver unit 202, a control unit 203, an operation unit 207, a display unit 208, a microphone 209, and a speaker 210.

The control unit 203 includes a CPU (Central Processing Unit) 200, an operating memory 204, a holding memory 205, an ID memory 206, and unillustrated hardware. In the control unit 203, the CPU 200 executes a group of programs prestored in the operating memory 204, and thus manages the respective units of the cellular phone 1.

Specifically, the CPU 200 of the control unit 203 detects a call number of the cellular phone 1 of its own from signals demodulated in the wireless transceiver unit 202, and thus issues a notice of an incoming call. Furthermore, the CPU 200 of the control unit 203 processes voice signals and digital data signals, and thus realizes a voice call utilizing the microphone 209 and the speaker 210 and data communications made as transmission/receipt of email and a connection to a server.

Furthermore, in the case of executing the group of programs prestored in the operating memory 204, the CPU 200 of the control unit 203 complies with an instruction entered by a user through the operation unit 207 and the pointing device 11.

In this embodiment, the pointing device 11 is a unit operated by the user for the purpose of changing a position (values of the abscissae and the ordinates in the system of coordinates) of an object to be operated, such as a pointer and a cursor, which is displayed on a display 208A of the display unit 208 (hereinafter, the object to be operated will be referred to as a "pointer"). Then, the pointing device 11 outputs a signal indicating value (x, y) of the abscissae and the ordinates in a two-dimensional coordinate system in response to the operation of the user. This values (x, y) in the coordinate system corresponds to a predetermined coordinate system employed in the control unit 203.

Here, an actual aspect of the pointing device 11 is, for example, an input device (auxiliary input device) such as a joystick and a pointing stick. Moreover, if a trackpad is of a type of detecting, as values of the abscissae and ordinates in the coordinate system, a position of operation by the user on an operation surface (pad), the trackpad is also applicable as the pointing device 11 according to this embodiment. However, the pointing device 11 is not limited to these conventional input devices. To the pointing device 11, devices operable by the user for the purpose of changing the position (values of the abscissae and the ordinates in the coordinate system) of the pointer (cursor) displayed on the display 208A are widely applicable.

Then, the control unit 203 detects the operation performed for the pointing device 11 by the user based on the signal indicating the above-described values (x, y) of the abscissae and the ordinates in the coordinate system. In addition, the control unit 203 controls the position of the pointer to be displayed on the display 208A on the display unit 208 in response to the detected operation (an operating direction and an amount of operation). These actions will be described-later in detail.

The operation unit 207 includes a keyboarding unit (not shown) through which the user enters information. The operation unit 207 is used for entering a telephone number when the user makes a phone call, for entering text in such a case of registering an address in an address book, and for entering settings for a variety of functions.

The display unit 208 includes the display 208A such as a liquid crystal display device. The display unit 208 displays on the display 208A a variety of entered contents linked to the operation of the user for the operation unit 207. Moreover, the display unit 208 displays on the display 208A the pointer linked to the operation of the user for the pointing device 11.

The ID memory 206 holds the call number (originated number) of the cellular phone 1 of its own. In the control unit 203, the CPU 200 uses the call number (originated number) retrieved from the ID memory 206 and collates data corresponding to a predetermined position of the demodulated signals with the call number.

The operating memory (RAM: random access memory) 204 is used as a work area for the operation of the CPU 200. The holding memory 205 is a non-volatile memory (a flash memory or the like), and holds, for example, an operation program for the CPU 200, a variety of parameters, user data (for example, an email document and the telephone number), and the like.

Note that, in some cases, a part of the operating memory 204, a part of the holding memory 205 and a part of the ID memory 206 are physically realized in divided regions of the same device.

The antenna 201 transmits/receives a phase-modulated electric wave, and in addition, has similar functions to those of an antenna of a publicly known wireless communications terminal device.

The wireless transceiver unit 202 demodulates the electric wave received from the antenna 201, and performs phase modulation for the digital signals outputted from the control unit 203. Moreover, the wireless transceiver unit 202 has similar functions to those of a wireless transceiver unit of a publicly known wireless communications terminal device.

Then, the microphone 209 receives a voice of the user. The speaker 210 outputs a voice (a sound) to the user.

Note that a generally-used technology at preset can be adopted for the very operations of the cellular phone 1, such as data transmitting/receiving processing and voice processing, which are executed between the cellular phone 1 itself and an external device in the above-described device configuration. Accordingly, detailed description for the operations will be omitted in this embodiment.

Next, a configuration of control of the pointing device 11, which is characteristic in the cellular phone 1 according to this embodiment, will be described with reference to FIGS. 2 to 6.

Figure 2:
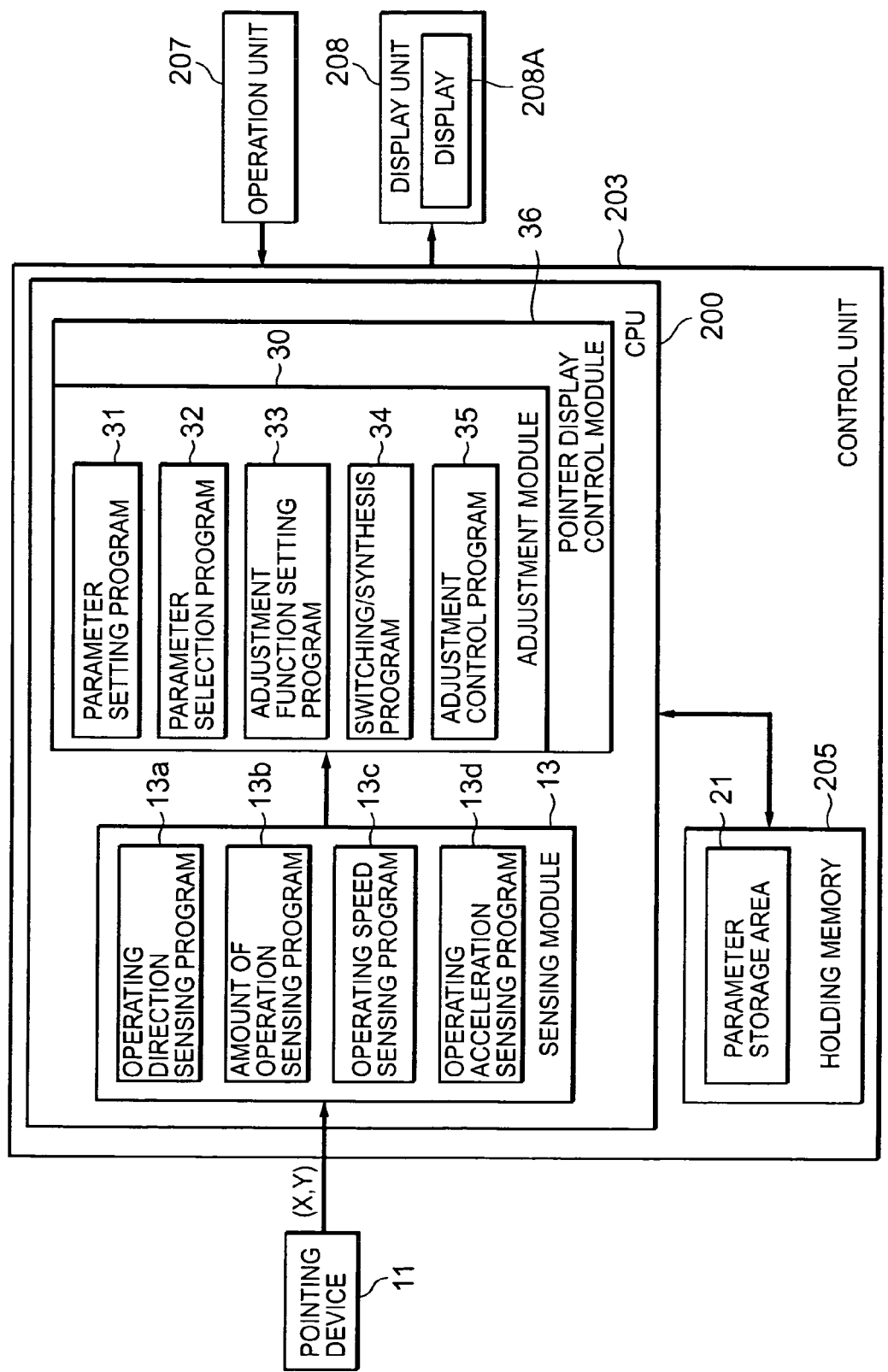
FIG. 2 is a configuration block diagram schematically showing a configuration of control of a pointing device 11, the control being executed by a CPU 200 in a cellular phone 1 according to this embodiment.

FIG. 2 is a block diagram schematically showing the configuration of control of the pointing device 11, which is executed by the CPU 200 in the cellular phone 1 according to this embodiment.

In this embodiment, in order to control the display unit 208 in response to the operation by the user of the pointing device 11, broadly, the CPU 200 of the control unit 203 does such broadly-categorized things as executes and controls the sensing module 13, the adjustment module 30, and a pointer display control module 36. In this case, the CPU 200 refers to parameters stored in a parameter storage area 21 in the holding memory 205. It is noted that the modules are predetermined functional units realized by software programs and the hardware.

In this embodiment, the sensing module 13 has a function to detect the operation by the user of the pointing device 11 based on the signal indicating the values (x, y) of the abscissae and the originates in the coordinate system outputted from the pointing device 11 (details will be described later).

The adjustment module 30 has a function to implement adequate adjustment processing in order to improve operability for the user in the case of determining a display position of the pointer based on output data of the sensing module 13 (details will be described later).

The pointer display control module 36 has a function to control the position of the pointer displayed on the display 208A of the display unit 208 in accordance with output data (a control signal) of the adjustment module 30.

Next, the details of the sensing module 13 and the adjustment module 30 will be described.

<Sensing Module 13>

As objects to be executed by the CPU 200, the sensing module 13 has an operating direction sensing program 13a, an amount of operation sensing program 13b, an operating speed sensing program 13c, and an operating acceleration sensing program 13d. For example, in the case of activating the cellular phone 1, the group of these programs is retrieved from the holding memory 205 to the CPU 200 or the operating memory 204.

Moreover, the operating direction sensing program 13a has a function to sense the operating direction of the pointing device 11 based on the signal outputted from the pointing device 11.

The amount of operation sensing program 13b has a function to sense the amount of operation of the pointing device 11 based on the signal outputted from the pointing device 11.

The operating speed sensing program 13c has a function to sense the operating speed of the pointing device 11 based on the signal outputted from the pointing device 11. Note that the operating speed may be calculated by differentiating the amount of operation sensed by utilizing the amount of operation sensing program 13b.

Furthermore, the operating acceleration sensing program 13d has a function to sense the operating acceleration of the pointing device 11 based on the signal outputted from the pointing device 11. Note that the operating acceleration may be calculated by differentiating the operating speed detected by utilizing the operating speed sensing program 13c.

The holding memory 205 stores an adjustment region (an adjustment target region) set up by an adjustment function setting program 33 to be described later. The adjustment region set up by this program is effective until another adjustment region is newly set up based on the parameters prestored in the parameter storage area 21.

Figure 3:
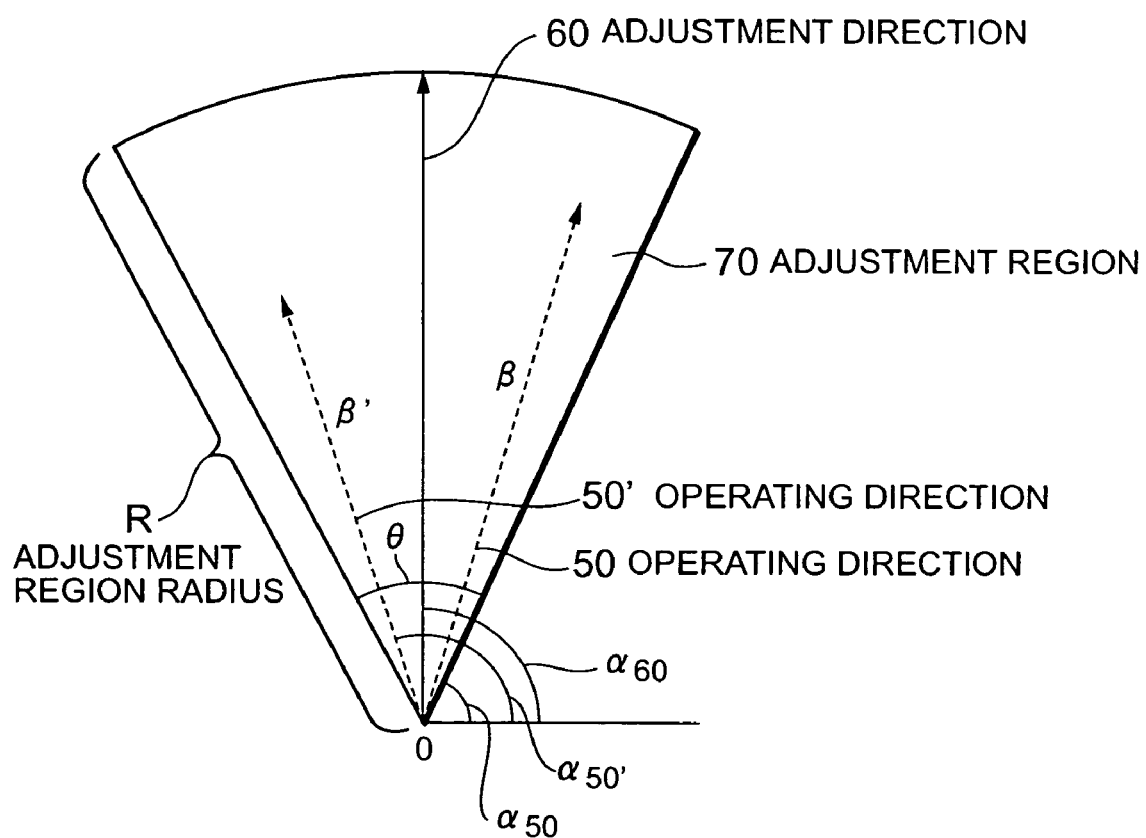
FIG. 3 is a view schematically showing a relationship between operating directions of the pointing device 11 and an adjustment direction thereof, in which an adjustment is performed by an adjustment module 30 executed by a control unit 203 in this embodiment.

FIG. 3 is a view schematically showing a relationship between the operating directions of the pointing device 11 and an adjustment direction thereof, in which an adjustment is performed by the adjustment module 30 executed by the control unit 203 in this embodiment.

In this embodiment, in the parameter storage area 21 of the holding memory 205, the parameters for setting the adjustment target region (adjustment region 70) by the adjustment module 30 and the adjustment direction corresponding to the adjustment region are prestored. Such adjustment processing is executed in the case where there are actual operation directions (operating directions 50 and 50') detected by the operating direction sensing program 13a in the region to be processed (adjustment region) 70 set up based on the parameters retrieved from the parameter storage area 21. Then, in this case, the operating directions 50 and 50' based on actual operations by the user are adjusted to an adjustment direction 60 indicating an operating direction after the adjustment by the adjustment processing using the adjustment module 30. In this case, the amount of operation (a magnitude of a vector) is not changed.

In this embodiment, in the parameter storage area 21, as the parameters for setting up the adjustment region 70 and the corresponding adjustment direction 60, the following are stored, which are:

An angle at the center of the adjustment region expressed by measure $\theta$ in radians;

Information indicating a relationship between the angle at the center of measure $\theta$ in radians and the adjustment direction 60 (or information indicating the adjustment direction), and a radius R of the adjustment region;

Number n of divided adjustment regions;

Radius r of an unadjusted circular range;

Operating speed v for start of the adjustment; and

Operating acceleration a' for the start of the adjustment.

However, the parameters stored in the parameter storage area 21 are not limited to these.

Note that the respective parameters to be stored, which are described above, may be ones prestored in the parameter storage area 21, or may be ones previously entered by the user by utilizing the operation unit 207.

<Adjustment Module 30>

As shown in FIG. 2, the adjustment module 30 includes a parameter setting program 31, a parameter selection program 32, an adjustment function setting program 33, a switching/synthesis program 34, and an adjustment control program 35.

The parameter setting program 31 has a function to set up (develop) the parameters retrieved from the parameter storage area 21 into the operating memory 204 and the like.

The parameter selection program 32 has a function to choose any parameter desired by the user out of the plural types of parameters prestored in the above-described parameter storage area 21.

Specifically, the parameter selection program 32 displays multiple sets consisting of the plural types of parameters as alternatives on the display 208A. Such sets consisting of the plural types of parameters corresponds, for example, to a pattern of the plural types of adjustment regions among a plurality of the patterns illustrated in FIGS. 4A to 4E to be described later. Accordingly, on this selection screen (not shown), the user chooses a desired multiple sets consisting of the plural types of the parameters by utilizing the operation unit 207. Thus, the user can change levels of comfortableness felt while operating the pointing device 11 according to his/her preference.

The adjustment function setting program 33 has functions to set up the adjustment region 70 based on the parameters chosen by the parameter selection program 32 and to set the adjustment direction 60 based on the set adjustment region.

The switching/synthesis program 34 has a function to choose an adjustment region out of the plurality of adjustment regions prestored in the holding memory 205. Then, the switching/synthesis program 34 has functions to change an adjustment region (first adjustment region) used currently by the adjustment module 30 based on the chosen adjustment region (second adjustment region) or, otherwise, to synthesize the first and second adjustment regions, and so on.

Then, the adjustment control program 35 has a function to adjust the operating directions 50 and 50' based on the actual operations by the user to the adjustment direction 60 in the adjustment region 70 set at present.

For more specific description, the case is assumed, for example, where an angle at the center of the adjustment region expressed by measure θ in radians and the adjustment region radius R are chosen out of the parameters prestored in the parameter storage unit 21 by the parameter selection program 32. In this case, the adjustment region setting program 33 sets up the sector-shaped adjustment region 70 as shown in FIG. 3, in which the angle at the center of the adjustment region is measure θ in radians and the adjustment region radius is R. Moreover, the adjustment function setting program 33 sets up the adjustment direction 60 indicated by a solid-line arrow in a range of the set adjustment region 70. Here, a specific setting direction of the adjustment region 60 is set, for example, at a half of the angle at the center of measure θ in radians.

The switching/synthesis program 34 has: p1 Changing function to change the adjustment region 70 currently used to another adjustment region chosen out of the plurality of adjustment regions stored in the holding memory 205;

Synthesis function to synthesize the plurality of adjustment regions; and

Control function to switch on/off the direction adjustment function by the adjustment control program 35 according to needs.

FIGS. 4A to 4E are views illustrating the adjustment regions settable by the adjustment module 30, in which the adjustments are executed by the CPU 200 in the cellular phone 1 according to this embodiment.

Here, each of FIGS. 4A to 4E distinguishes among the adjacent adjustment regions by hatching using oblique lines for the purpose of clarifying the individual adjustment regions. For example, in FIG. 4A, four adjustment regions 71 in which the angle at the center of measure θ is equal to π/2 (at angle of 90 degrees) are shown. Moreover, in FIG. 4B, eight adjustment regions 72 in which the angle at the center of measure θ in radians is equal to π/4 (at angle of 45 degrees) are shown.

Then, each operation circle 80 having the reference point O as a central point is one in which a physically operable range of the pointing device 11 is represented as a circle having a radius of maximum amount of operation Rmax.

Figure 4A:
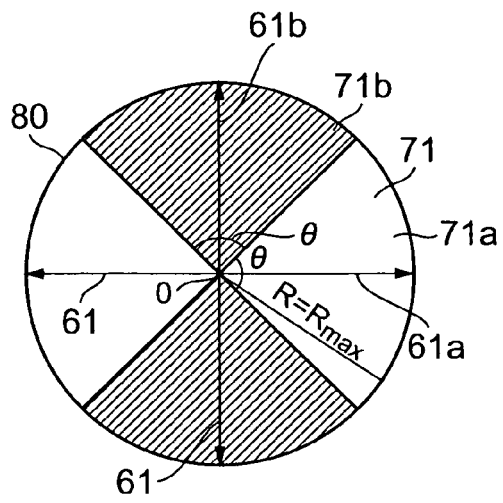
FIGS. 4A to 4E are views illustrating adjustment regions which can be set up by the adjustment module 30, in which adjustments are executed by the CPU 200 in the cellular phone 1 according to this embodiment.
Figure 4B:
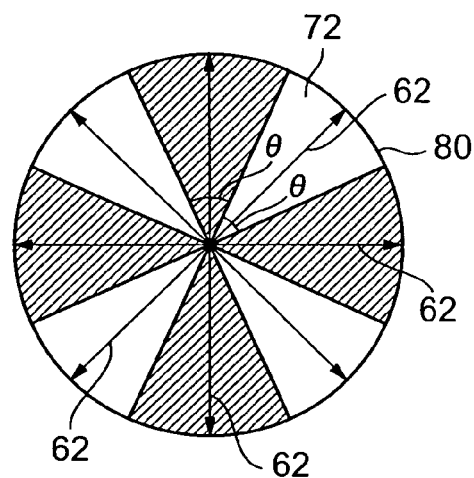

For example, the case is assumed, where the adjustment regions 71 as shown in FIG. 4A are currently set up by the adjustment function setting program 33, and the adjustment regions 72 as shown in FIG. 4B are stored in the holding memory 205. In this case, the switching/synthesis program 34 can change the adjustment regions 71 forming the pattern shown in FIG. 4A to the adjustment regions 72 forming the pattern shown in FIG. 4B.

Figure 4C:
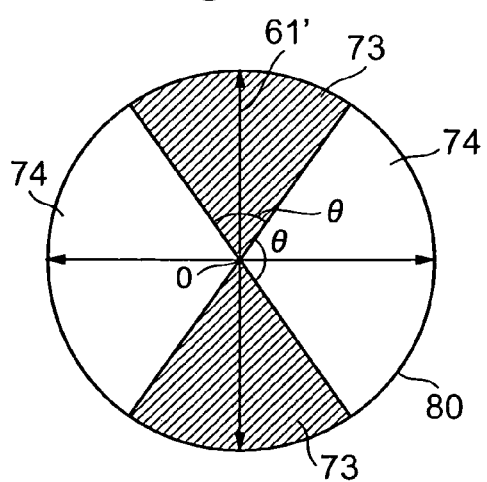
Figure 4D:
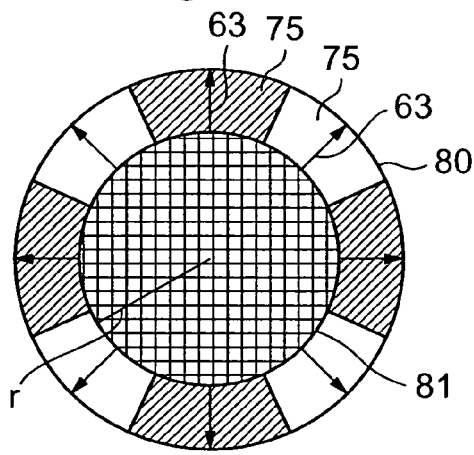
Figure 4E:
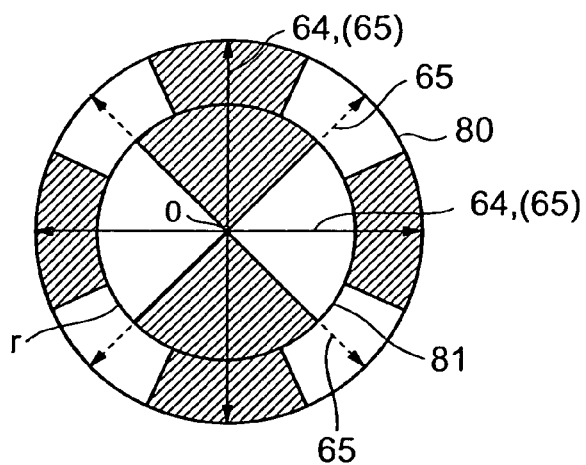

Alternatively, the switching/synthesis program 34 can setup a plurality of adjustment regions forming a pattern shown in FIG. 4E by synthesizing the adjustment regions 71 forming the pattern shown in FIG. 4A and the adjustment regions 72 forming the pattern shown in FIG. 4B.

Moreover, the switching/synthesis program 34 can set up adjustment regions 75 forming a pattern as shown in FIG. 4D by synthesizing the adjustment regions 72 forming the pattern shown in FIG. 4B and an unadjusted region (corresponding to a grid-shaped portion inside an operation circle with the radius r).

Note that details of the respective adjustment regions shown in FIGS. 4A to 4E will be described later.

Then, the adjustment control program 35 determines whether or not an operation state of the pointing device 11 (the operating directions 50 and 50') detected by the sensing module 13 is of the operation in the adjustment region 70 currently set up by the adjustment function setting program 33. Next, when it is determined that such an operation state is within the adjustment region, the adjustment control program 35 outputs a control signal indicating the adjustment direction 60 preset so as to correspond to the adjustment region, as the current operation state of the pointing device 11, to the pointer display control module 36.

Next, the concept of the adjustment control by the above-described adjustment module 30 will be described in far more detail with reference to FIG. 3.

In this embodiment, the adjustment region 70 shown in FIG. 3 is set up in the following manner.

First, the CPU 200 executes the parameter selection program 32, and thus, the angle at the center of the adjustment region expressed by measure θ in radians and the radius R of the adjustment region, which are stored in the parameter storage area 21, are chosen as the set of the desired parameters chosen by the user.

Next, the CPU 200 executes the adjustment function setting program 33, and thus, based on the selected angle at the center of the adjustment region expressed by measure θ in radians and adjustment radius R, the adjustment region 70 shaped like a sector subtended by the angle at the center of measure θ in radians and the radius of R with the reference point O taken as a center is set up.

Meanwhile, the CPU 200 executes the respective programs (13a to 13d) of the above-described sensing module 13, and thus the operation state of the pointing device 11 by the user is sensed.

Specifically, the sensing module 13 transfers to the adjustment control program 35 signals (information), as the operation state of the pointing device 11, concerning the operating direction (actual operation direction), the amount of operation, the operating speed and the operating acceleration.

Upon receiving these signals, the adjustment control program 35 determines whether or not the operation of the pointing device 11 is the operation in the adjustment region 70 preset by the adjustment function setting program 33. Then, when it is determined that the operation of the pointing device 11 is the operation within the adjustment region concerned, the adjustment control program 35 outputs the control signal indicating the adjustment direction 60 so preset as to correspond to the adjustment region, as the present operation state of the pointing device 11, to the pointer display control module 36. Meanwhile, when it is determined in the determination described above that the operation is an operation outside the adjustment region, the adjustment control program 35 outputs a control signal in response to the actual operation of the pointing device 11 to the pointer display control module 36 without making any adjustment.

Specifically, when the pointing device 11 is operated toward the operating directions 50 and 50' shown with broken lines, and the like in the adjustment region 70, all of the operating directions are adjusted, by the adjustment control program 35, to the adjustment direction 60 shown by the solid-line arrow. Note that such an adjustment is only a direction conversion in which orientations $\alpha_{50}$ and $\alpha_{50'}$ of the operating directions 50 and 50' are adjusted to an orientation $\alpha_{60}$ of the adjustment direction vector 60. The adjustment control program 35 does not adjust the amounts of operation $\beta$ and $\beta'$ (that is, lengths of the operating direction vectors 50 and 50'). In other words, the adjustment control program 35 performs processing of converting the directions of the amount of operation vectors $\beta$ and $\beta'$ oriented toward the operating directions 50 and 50' to an orientation designated by the adjustment direction 60 without changing the magnitudes of the vectors. Then, this direction conversion processing can be realized by adjusting (replacing) the information indicating the operating directions 50 and 50' to information indicating the adjustment direction 60. Here, the information indicating the adjustment direction 60 is one acquired from the parameters prestored in the parameter storage area 21.

In such a way, the operation of the pointing device 11, which is adjusted to the adjustment direction 60, is displayed on the display unit 208 as a pointer moving toward the adjustment direction 60 by a distance corresponding to the amount of operation $\beta$.

Next, examples of setting up the adjustment regions will be described with reference to FIGS. 4A to 4E.

The respective adjustment regions shown in FIGS. 4A to 4E are set up with the angle at the center of measure $\theta$ in radians and the radius of the adjustment region R used as the parameters.

The circle 80 shown in FIG. 4A is quartered by the adjustment regions 71 in which the angle at the center of measure $\theta$ in radians is equal to measure $\pi/2$ (at angle of 90 degrees) in radians and the radius R is equal to Rmax. Moreover, each adjustment direction 61 is set up in a direction bisecting the angle at the center of measure $\theta$ in radians. By the settings as described above, the operating directions of the pointing device 11, which correspond to the ranges of the adjustment regions 71, are adjusted to four directions shown by the adjustment directions 61 orthogonal to each other. For example, the operating direction of the pointing device 11 in an adjustment region 71a is adjusted to an adjustment direction 61a. Moreover, the operating direction of the pointing device 11 in an adjustment region 71b is adjusted to an adjustment direction 61b.

Next, the operation circle 80 shown in FIG. 4B is divided into eight equal parts by the adjustment regions 72 in which the angle at the center of measure $\theta$ in radians is equal to measure $\pi/4$ (at angle of 45 degrees) in radians and the radius R is equal to Rmax. Moreover, each adjustment direction 71 is set up in a direction bisecting the angle at the center of measure $\theta$ in radians of each adjustment region 72. By the settings as described above, the operating directions of the pointing device 11 in the adjustment regions 72 are adjusted to eight directions shown by the adjustment directions 62.

Note that the adjustment regions based on the operation circle in which the radius R is equal to Rmax, the adjustment regions dividing the operation circle 80 into equal parts as shown in FIGS. 4A and 4B, may be set up in accordance with the number n of dividing the operation circle 80, without using the angle at the center of measure $\theta$ in radians as the parameter.

Next, the operation circle 80 shown in FIG. 4C is divided into two types of adjustment regions 73 and 74 in which the radius R is equal to Rmax and the angles at the centers are measures $\theta$ and $\theta'$ in radians. In such a way, it is also possible for the adjustment module 30 of this embodiment to set up adjustment regions forming a pattern other than those having the equally divided adjustment regions illustrated in FIGS. 4A and 4B.

The adjustment regions 75 forming a pattern shown in the operation circle 80 shown in FIG. 4D is obtained by synthesizing the adjustment regions 72 shown in FIG. 4B and an unadjusted range circle 81 with the radius r. Here, the unadjusted range circle 81 represents a region to which the adjustment of the operating direction is not performed. Specifically, in this case, in addition to the parameters (adjustment region radius R=Rmax, and the angle at the center of adjustment region expressed by measure $\theta$ in radians) chosen in the setting of the adjustment regions 72, the parameter selection program 32 chooses the radius r of the unadjusted range circle 81 from the parameter storage area 21. Then, the adjustment regions 75 in the pattern shown in FIG. 4D are set up by synthesizing the adjustment regions 72 in the pattern shown in FIG. 4B and the unadjusted range circle 81 by the switching/synthesis program 34. Thus, in the unadjusted range circle 81 to which the grid hatching is made in FIG. 4D, the adjustment of the operating direction of the pointing device 11 is not performed. Specifically, it is possible to operate the pointing device 11 to the respective directions with resolution originally owned by the pointing device 11. Meanwhile, in this case, adjustments to adjustment directions 63 are performed only in the adjustment regions 75 which are outside the unadjusted range circle 81 and are eight equally divided parts.

In the case shown in FIG. 4D, the radius r of the unadjusted range circle 81 may be one defined by the operating speed v of the pointing device 11 and the acceleration a thereof, which are detected by the sensing module 13.

Figure 5A:
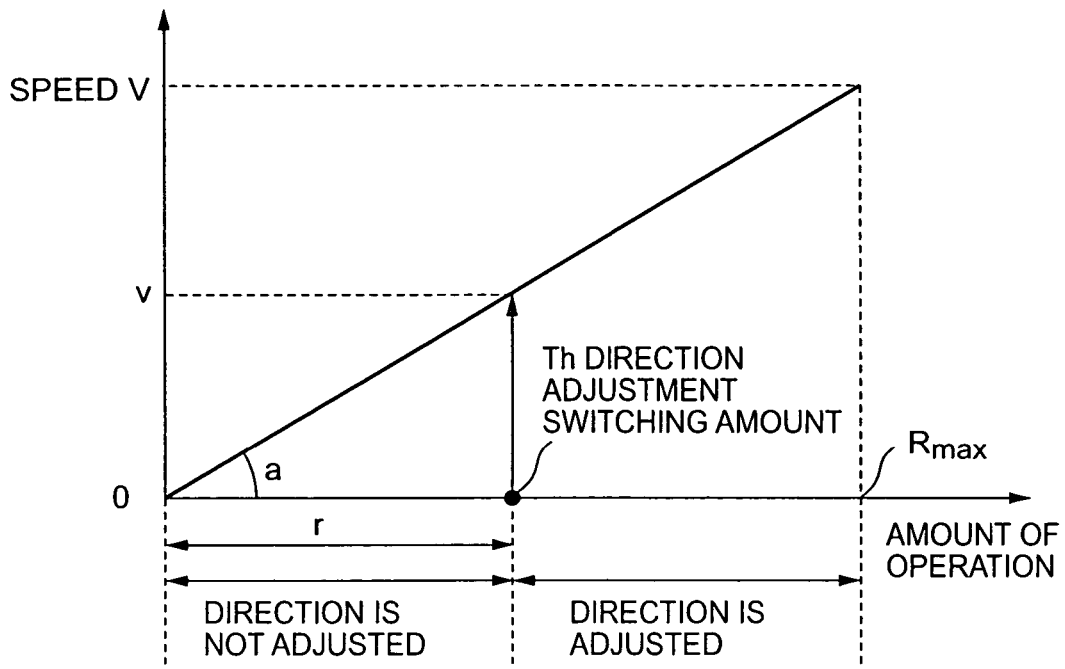
FIGS. 5A and 5B are graphs showing relationships between amounts of operation and operating speeds of the pointing device 11, which are detected by a sensing module 13.
Figure 5B:
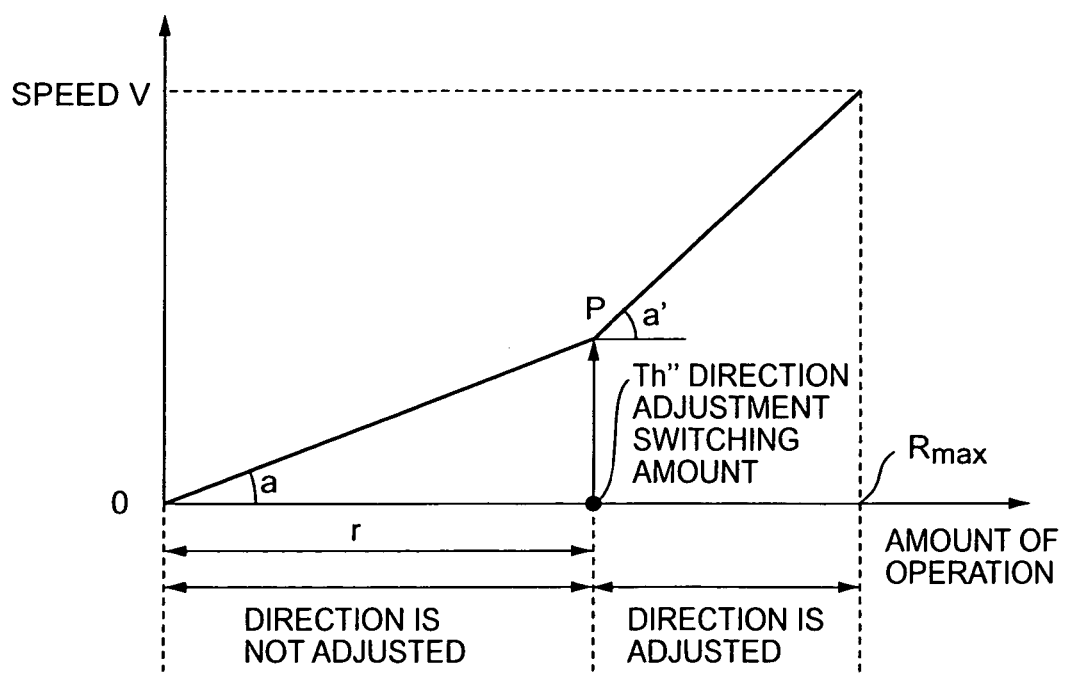

FIGS. 5A and 5B are graphs showing relationships between the amounts of operation of the pointing device 11 and the operating speeds thereof, which are detected by the sensing module 13.

As shown in FIG. 5A, in many cases, the control of the pointing device and pointer corresponding thereto has a relationship (control characteristics) in which the speed of the object to be operated is accelerated as the amount of operation is increased.

Accordingly, in this embodiment, on the basis of such control characteristics as described above, a direction adjustment switching amount Th is defined as a parameter (threshold value) between zero (reference point) of the amount of operation and the maximum (Rmax) thereof, which are shown on an axis of abscissae. Thus, if the amount of operation is less than this direction adjustment switching amount Th, the above-described direction adjustment control is not performed. On the other hand, if the amount of operation is equal to, or more than, the direction adjustment switching amount Th, the direction adjustment control is performed. Switching control using the direction adjustment switching amount Th as a reference is performed by the adjustment module 30. Thus, in an operation range requiring a delicate operation, the delicate operation is made possible because the direction adjustment control is not performed. On the other hand, when the detected operating speed is relatively rapid, it is expected that the user desires to move the object (pointer) to be controlled far in a shorter time. In such a case, an operation good at linearity can be realized.

Note that a relationship between the amount of operation of the pointing device 11 and the moving speed thereof is in linear characteristics as shown in FIG. 5A. Accordingly, a direction adjustment switching amount Th' is defined as a threshold value for switching the control on the operating speed v shown in an axis of ordinates. Then, as in the above-described case, the direction adjustment control may be switched on and off in response to whether or not the operating speed detected by the sensing module 13 is larger than the direction adjustment switching amount Th'.

Moreover, there is also a case where the relationship between the amount of operation of the pointing device 11 and the moving speed thereof is not linear as shown in FIG. 5B (here, the operating acceleration is represented by gradients of straight lines shown in the drawing). In such a case, when the control characteristics cause the acceleration of the pointing device 11 on the move to be changed from a to a', the operating acceleration a' at the start of adjustment is defined as a threshold value for switching the control (a direction adjustment switching amount Th"). Then, as in the above-described case, the adjustment control may be switched on and off in response to whether or not the operating acceleration detected by the sensing module 13 is larger than the direction adjustment switching amount Th".

Next, adjustment control of the pointing device in the operation circle 80 having the adjustment regions 75 and the unadjusted range circle 81 as shown in FIG. 4D will be described with reference to a flowchart shown in FIG. 6.

Figure 6:
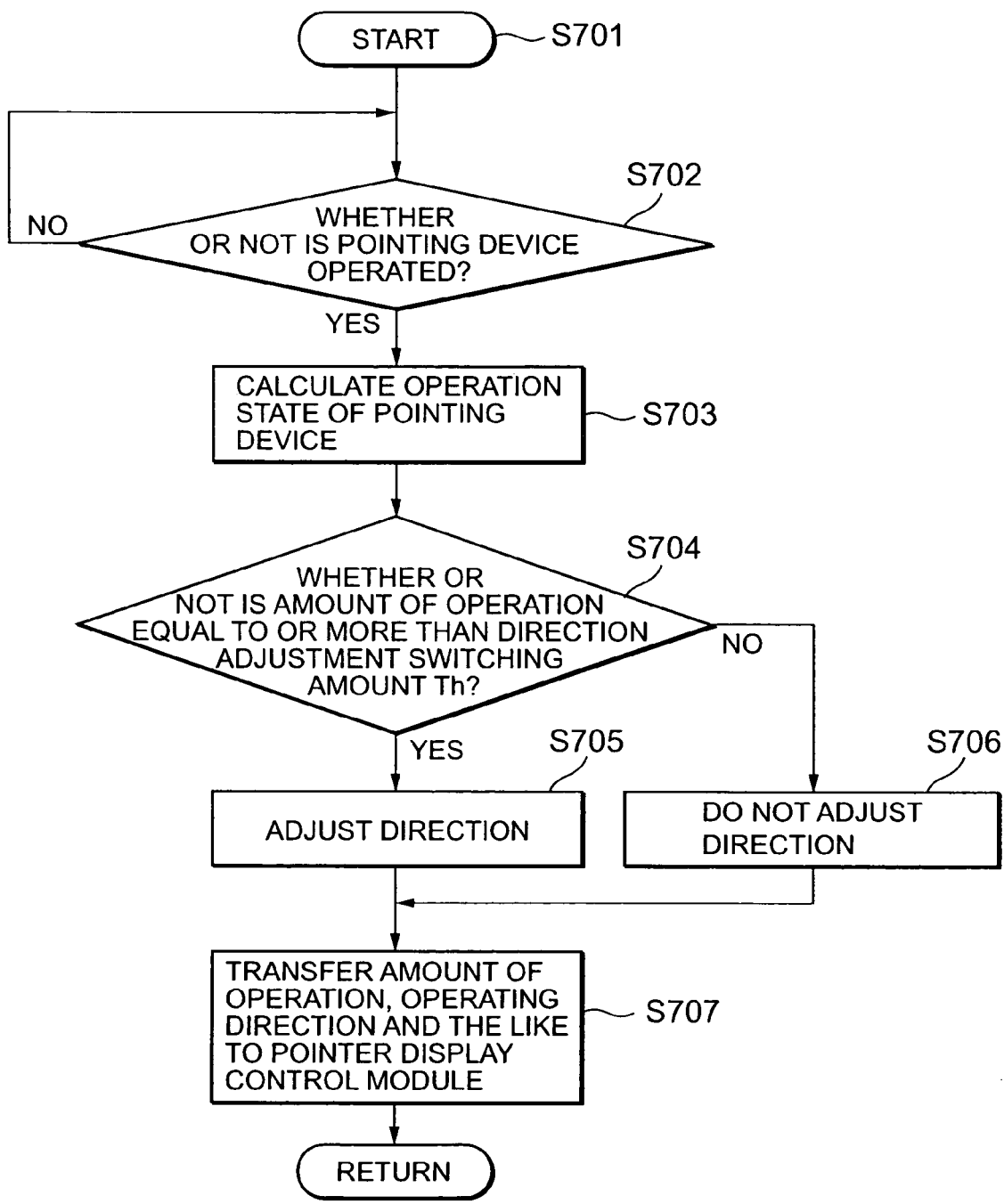
FIG. 6 is a flowchart of adjustment control of the pointing device when an unadjusted circular range is set in the control unit 203 of the cellular phone according to this embodiment.
Figure 7:
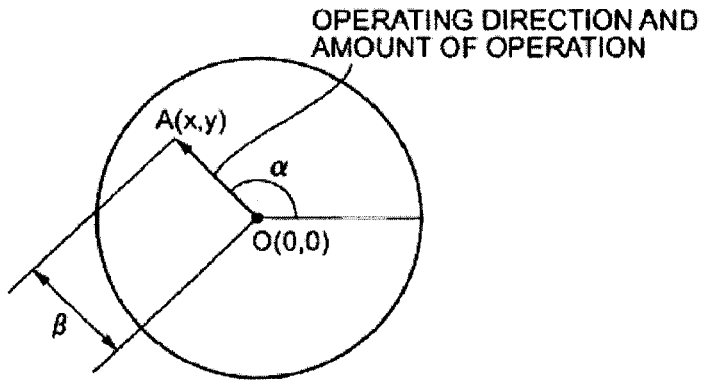
FIG. 7 is a view showing a relationship between an operating direction and an amount of operation in a conventional pointing device.
Figure 8A:
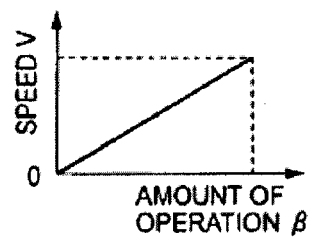
FIGS. 8A to 8G are views showing relationships between the amounts of operation and operating speeds in conventional pointing devices.
Figure 8B:
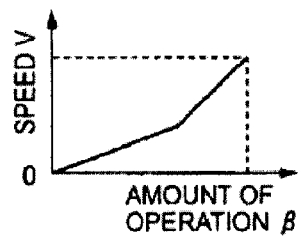
Figure 8C:
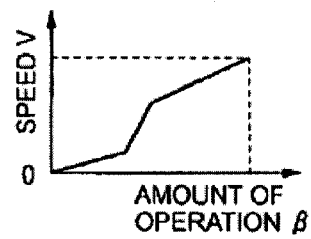
Figure 8D:
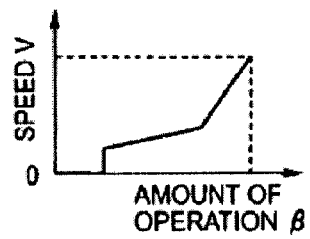
Figure 8E:
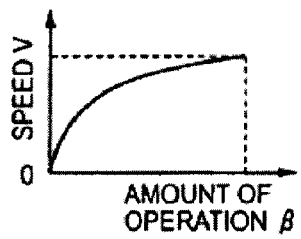
Figure 8F:
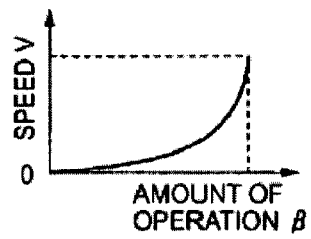
Figure 8G:
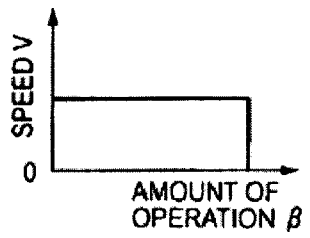

Specifically, FIG. 6 is the flowchart of the adjustment control of the pointing device pursued when the unadjusted circular range is set up in the control unit 203 of the cellular phone 1 according to this embodiment. Such a flowchart shows a processing procedure of the software programs executed by the CPU 200 of the control unit 203 in the cellular phone 1 shown in FIG. 1.

First, in this embodiment, the CPU 200 stores, in the operating memory 204, the display position (values of the abscissae and the ordinates in the coordinate system) of the pointer currently displayed on the display 208A, for example, by the function of the pointer display control module 36. The stored display position is referred to as a reference position in S703.

The adjustment control shown in FIG. 6 is started, for example, in response to a power source of the cellular phone 1 being switched on by the user (S701).

The CPU 200 first determines whether or not the pointing device 11 is operated by the user (S702). For the determination, an interrupt signal or the like which indicates that the pointing device 11 is operated is commonly used. Moreover, in many cases, although the pointing device 11 that is a unit to be operated, a region which does not react even if the pointing device 11 is somewhat moved is provided in order to allow a mechanical idleness.

Next, when it is recognized in the determination in S702 that the pointing device 11 is operated, the CPU 200 calculates the operation state of the pointing device 11 (that is, information indicating the operation state) with the display position of the pointer at that time defined as the reference position (S703). Here, the operation state is calculated by the CPU 200 executing the function of the sensing module 13 described above. Hence, the operation state includes the present operating direction, amount of operation, operating speed and operating acceleration of the pointing device 11.

Thereafter, the CPU 200 determines whether or not the amount of operation calculated in S703 is equal to, or more than, the radius r of the unadjusted range circle 81, which is represented by the direction adjustment switching amount Th (Th') described above with reference to FIGS. 5A and 5B (S704).

Next, when the amount of operation is equal to, or more than, the direction adjustment switching amount Th in the determination in S704, the CPU 200 performs the direction adjustment control described above with reference to FIG. 3 and FIGS. 4A to 4E (S705). On the other hand, when the amount of operation is less than the direction adjustment switching amount Th in the determination in S704, the CPU 200 does not perform such direction adjustment control (S706).

Then, in response to the above-described processing in S705 and S706, the CPU 200 performs processing in S707. Specifically, when the direction adjustment is performed in S705, the CPU 200 transfers the amount of operation calculated in S703, the operating direction subjected to the direction adjustment in S705 and the like to the pointer display control module 36. On the other hand, when the direction adjustment is not performed in S706, the CPU 200 transfers the amount of operation calculated in S703, the operating direction and the like, to the pointer display control module 36.

Here, the processing in each step of S704 to S707 described above is realized by the CPU 200 executing the above described adjustment module 30 (mainly, the adjustment control module 35).

Then, by the function of the pointer display control module 36, the CPU 200 controls the display unit 208 based on the control information transferred from the adjustment module S707, and thus displays the pointer on an appropriate position on the display 208A.

The processing flow is configured in such a manner that the above-described S702 to S707 are sequentially executed and the processing returns to S702 that is a start of the repetition. Usually, this repetition is performed at an arbitrary fixed intervals.

<Modifications of Embodiment>

MODIFICATION EXAMPLE 1

Note that, in FIG. 4D, an example of the pattern obtained by synthesizing the unadjusted range circle 81 and the adjustment regions 72 shown in FIG. 4B is shown. However, the synthesis pattern is not limited to this. For example, the pattern may be the adjustment regions 71 shown in FIG. 4A or may be one formed by synthesizing the adjustment regions 73 and 74 shown in FIG. 4C as well as the unadjusted range circle 81.

MODIFICATION EXAMPLE 2

Moreover, in the above-described pattern in FIG. 4D, an example of a setting for the adjustment control to switch on and off the adjustment at a boundary defined by the radius r. However, as shown in FIG. 4E, such a setting may be made, in which four adjustment directions 64 are switched to eight adjustment directions 65 at a boundary defined this radius r, these directions 64 and 65 being two stages in the switching. Furthermore, such control for switching the number of adjustment directions is not limited to the switching from the four directions to the eight directions. Specifically, the number of adjustment directions may be increased or decreased according to needs. Alternatively, a pattern may be configured to perform the switching control for three stages or more.

MODIFICATION EXAMPLE 3

Moreover, in some cases, the resolution of the display or resolving power of the pointing device is different between a vertical (longitudinal) direction and a left-and-right (lateral) direction. In such a case, for example, like the above-described pattern of the adjustment regions shown in FIG. 4C, a pattern may be set up as to be different between the adjustment regions in the vertical direction (in other words, the longitudinal direction, the fore-and-aft direction) and in the left-and-right direction. Alternatively, a modification example in which the adjustment region is not provided in some direction is also assumed. According to such modification examples as described above, discomfort felt by the user, which is caused by the display configuring what is called man-machine interface or by the hardware of the pointing device, can be eliminated by the parameters stored in the parameter storage area 21. Hence, according to such modification examples as described above, the adjustment can be performed in a short time at low cost as compared with the case of improving the hardware. Thus, the modification examples are practical and economical.

Note that, among the generally-used pointing devices, in the pointing device performing the control by using the amount of operation and the operating direction from the reference point O, the operation range thereof is a circle or can be regarded as a circle in many cases. Therefore, in this embodiment described above, description has been made with recognition that the moving range (movable range) of the pointing device is the operation circle, and on the assumption that one direction adjustment range is shaped like a sector. However, the operation range and the shape of the adjustment range are not limited to those.

Moreover, though the operation range and the adjustment range have been thought to be on a two-dimensional plane in the above-described embodiment, such an embodiment in which a similar direction adjustment is performed on a three-dimensional object such as a spherical object is also conceivable. Furthermore, it is satisfactory if the number of adjustment directions is chosen appropriately in response to the object to be operated, the number of directions required for the operation, the operation feeling and the like.

Moreover, in the above-described embodiment and modification examples, description has been made by taking, as an example, the method of control by a joystick type pointing device, in which the control is performed by use of an operating direction and the amount of operation from the reference point O. However, the scope of the application of the present invention is not limited to such a control method. More specifically, also, by improving linearity of a usual mode and a direction adjustment mode by the hardware or the software, it is made possible to apply the present invention to a pointing device of a type that has a specific reference point such as a mouse. Alternatively, by controlling such things as the adjustment control only when the moving speed is equal to, or more than, an arbitrary fixed speed, it is made possible to apply the present invention to the pointing device of the type above mentioned.

As described above, according to this embodiment, a slight directional shift and the like between the actual operation of the pointing device 11 in the adjustment regions (adjustment regions 70 to 75 and 80) and the pointer (object to be controlled) displayed on the display 208A are adjusted to the proper adjustment directions (60 to 65) by means of the function of adjustment control program 35. Therefore, it is made possible to enhance the operability of the pointing device 1.

Moreover, according to the present invention, by operating the operation unit 207 when the parameter selection program 32 is executed, the user can easily change the patterns of the adjustment regions, which are employed for the adjustment control. Thus, the user can change the comfortableness felt for the pointing device 11 according to his/her preference, and accordingly, this embodiment is good at adaptability.

Note that it is obvious that the present invention is not limited to each embodiment described above, and that each embodiment can be changed appropriately within the scope of the technical concept of the present invention. Specifically, the present invention is not limited to application to a portable communications terminal device such as a cellular phone, and can be widely applied to a portable electronic instrument with a smaller casing, such as an information processing apparatus such as a game instrument and a PDA.

Moreover, in this embodiment described above, description has been made by taking, as an example, the configuration in which the pointing device 11 actually operated by the user and the sensing module 13 detecting the operation are provided separately. However, the present invention is not limited to this device configuration, and for example, a configuration is also assumed, in which software and/or hardware realizing a similar function to that of the sensing module 13 are provided in the inside of the pointing device.

Furthermore, in this embodiment described above, the example in which the sensing module 13 and the adjustment module 30 are executed in the inside of the cellular phone 1 has been described. However, the pointing device control apparatus according to the present invention is not limited to this device configuration. More specifically, for example, a mode of usage in which the pointing device is connected to an information processing apparatus such as a desktop personal computer and a game instrument is widespread. In such a mode of usage, it is assumed that the pointing device, the sensing module 13 and the adjustment module 30 are distributed separately from the information processing apparatus to which those are connected. Accordingly, in such a case, a program having at least the function of the adjustment module 30 is distributed through a recording medium or a communication line, or executed in the information processing apparatus, and thus the present invention will be configured.

Furthermore, in this embodiment described above, description has been made by taking, as an example, the pointer displayed on the cellular phone 1 as the object to be controlled. However, the object to be controlled, to which the present invention is applicable, is not limited to this. For example, in a portable game instrument, with regard to the object to be controlled, which is displayed on the display, an operation of moving display positions of a variety of symbols (for example, characters representing people, animals and the like, and the like) is performed by the user. By applying the present invention, too, to such a case, it is made possible to enhance the operability of the pointing device.

Note that the present embodiment described based on the embodiment and the modification examples thereof, which are described above, is achieved by providing a computer program which can realize the function of the flowchart referred to in the description of the embodiment and the like to the cellular phone 1 described above, and by subsequently retrieving the computer program to the CPU 200 to execute the program. Moreover, in this case, it is satisfactory if the computer program provided to the apparatus may be stored in a storage device such as a readable/writable memory (the holding memory 205 and the like).

Moreover, in the case described above, a method of providing the computer program to the apparatus concerned is not limited only to a method of installing the computer program to a computer or the like in production facilities before shipment thereof. For example, a generally used procedure at present can be employed, such as a method of installing the program through a variety of recording media attachable/detachable onto/from a main body of the apparatus, and a method of downloading the program from the outside through a line of communications such as the Internet. Then, in such a case, the present invention is constituted of coding of such a computer program or a storage medium.

As described above, according to the embodiment and the modification examples thereof, the operability of the object to be controlled, which is to be operated, can be enhanced even in a mounting environment where it is difficult to ensure a sufficient mounting area for the pointing device.

While the present invention has been described in connection with the preferred embodiments, it is to be understood that the subject matter encompassed by way of the present invention is not to be limited to those specific embodiments. On the contrary, it is intended for the subject matter of the present invention to include all alternatives, modifications and equivalents as can be included within the spirit and scope of the following claims.

What is claimed is:

1. A pointing device control apparatus for controlling a position of an object to be controlled which is displayed on a display in response to operation of a pointing device by a user, said pointing device control apparatus comprising:
   setting means for setting up an adjustment region and a predetermined direction corresponding to the adjustment region, with a movable range of the pointing device as an object to be adjusted, the movable range being treated as information based on a predetermined coordinate system in the control apparatus; and
   adjustment control means for adjusting information indicating an actual operation direction when the actual operation direction of the pointing device operated by the user is included in the adjustment region set by said setting means to information indicating the predetermined direction which is set by the setting means so as to correspond to the adjustment region, such that a moving direction of the object to be controlled which is displayed on the display in response to the actual operation direction is changed to the predetermined direction without changing a magnitude of the moving direction.

2. The pointing device control apparatus according to claim 1, wherein said setting means includes selection means capable of choosing an adjustment region desired by the user to be employed for adjusting the actual operation direction, from previously prepared plural types of adjustment regions.

3. The pointing device control apparatus according to claim 2, wherein said setting means includes synthesis means for synthesizing at least two types of adjustment regions selectable by the user from previously prepared plural types of adjustment regions, wherein at least one of the two types of adjustment regions is employed for adjusting the actual operation direction.

4. The pointing device control apparatus according to claim 2, wherein said adjustment control means adjusts the information indicating the actual operation direction in order to adjust the actual operation direction to the predetermined direction when any of an amount of operation of the pointing device and an operating speed thereof is larger than a predetermined threshold value.

5. The pointing device control apparatus according to claim 1, wherein said setting means includes synthesis means for synthesizing at least two types of adjustment regions selectable by the user from previously prepared plural types of adjustment regions, wherein at least one of the two types of adjustment regions is employed for adjusting the actual operation direction.

6. The pointing device control apparatus according to claim 1, wherein said adjustment control means adjusts the information indicating the actual operation direction in order to adjust the actual operation direction to the predetermined direction when any of an amount of operation of the pointing device and an operating speed thereof is larger than a predetermined threshold value.

7. The pointing device control apparatus according to claim 6, further comprising detection means for detecting any of the amount of operation of the pointing device and the operating speed thereof as well as the actual operation direction.

8. The pointing device control apparatus according to claim 1, wherein said adjustment control means includes operation means capable of switching on and off the adjustment of the actual operation direction to the predetermined direction.

9. The pointing device control apparatus according to claim 1, wherein a plurality of the adjustment regions are set up with a center position of the movable range of the pointing device designated as a reference.

10. The pointing device control apparatus according to claim 9, wherein the plurality of adjustment regions are made of at least two types of the adjustment regions, the regions being different in size from each other.

11. The pointing device control apparatus according to claim 10, wherein, in the movable range of the pointing device, the at least two types of adjustment regions are different in size from each other in a longitudinal direction and in a lateral direction.

12. The pointing device control apparatus according to claim 9, wherein, when the plurality of adjustment regions are set up in the movable range of the pointing device, the movable range includes an area where any adjustment region is not set, the included region being set up with the center position designated as the reference.

13. The pointing device control apparatus according to claim 9,
   wherein each of the adjustment regions is shaped like a sector subtended by a predetermined angle at the center with the center position designated as the reference, and
   the predetermined direction is a direction obtained by bisecting the angle at the center.

14. The pointing control apparatus according to claim 9, wherein when the plurality of adjustment regions are set up in the movable range of the pointing device,
   said setting means sets a first adjustment region in a first predetermined direction corresponding to the first adjustment region when the actual operation direction of the pointing device operated by a user is included in the first adjustment region and any of an amount of operation of the pointing device and an operating speed thereof is larger than a predetermined threshold value, and
   said setting means sets a second adjustment region and a second predetermined direction corresponding to the second adjustment region when the actual operation direction of the pointing device operated by the user is included in the second adjustment region and any of an amount of operation of the pointing device and an operating speed thereof is smaller than the predetermined threshold value, where an angle at the center position of the second adjustment region is different from an angle at the center position of the first adjustment region.

15. The pointing device control apparatus according to claim 1, further comprising detection means for detecting at least the actual operation direction of the pointing device.

16. The pointing device control apparatus according to claim 1, wherein the pointing device is at least any one of a joystick, a pointing stick and a trackpad.

17. An electronic instrument comprising the pointing device control apparatus according to claim 1.

18. The electronic instrument according to claim 17, wherein the electronic instrument is any of a cellular phone and a portable information terminal device (PDA).

19. A pointing device control method for controlling a position of an object to be controlled which is displayed on a display in response to operation by a user of a pointing device, the method comprising:

detecting at least an actual operation direction of the pointing device operated by the user;

setting up an adjustment region and a predetermined direction corresponding to the adjustment region, with a movable range of the pointing device as an object to be adjusted, the movable range being treated as information based on a predetermined coordinate system in a control apparatus; and adjusting information indicating an actual operation direction when the actual operation direction of the pointing device detected in said detecting is included in the adjustment region set in said setting, to information indicating the predetermined direction which is set in said setting so as to correspond to the adjustment region, such that a moving direction of the object to be controlled which is displayed on the display in response to the actual operation direction is changed to the predetermined direction without changing a magnitude of the moving direction.

20. The pointing device control method according to claim 19, wherein, in said adjusting, the information indicating the actual operation direction is adjusted in order to adjust the actual operation direction to the predetermined direction when any of an amount of operation of the pointing device and an operating speed thereof is larger than a predetermined threshold value.

21. A computer readable medium, in which a computer program is stored, to be executed on a computer for controlling operation of a pointing device control apparatus which controls a position of an object to be controlled, which is displayed on a display in response to an operation of a user for a pointing device, the computer program causing the computer to realize:

a setting function of setting up an adjustment region and a predetermined direction corresponding to the adjustment region with a movable range of the pointing device as an object, the movable range being treated as information based on a predetermined coordinate system in the control apparatus; and an adjustment control function of adjusting information indicating an actual operation direction of operation of the pointing device by the user to information indicating the predetermined direction, which is set by said setting function so as to correspond to the adjustment region, such that a moving direction of the object to be controlled which is displayed on the display in response to the actual operation direction is changed to the predetermined direction without changing magnitude of the moving direction when the actual operation direction is included in the adjustment region.

22. The computer program according to claim 21, further causing the computer to realize a detection function of detecting at least the actual operation direction of the pointing device.

* * * * *

UNITED STATES PATENT AND TRADEMARK OFFICE
CERTIFICATE OF CORRECTION

PATENT NO. : 7,518,595 B2  Page 1 of 1
APPLICATION NO. : 10/873458
DATED : April 14, 2009
INVENTOR(S) : Takashi Tachikawa It is certified that error appears in the above-identified patent and that said Letters Patent is hereby corrected as shown below:

Col. 9, line 36, delete p1.

Signed and Sealed this

Twentieth Day of October, 2009

David J. Kappos
*Director of the United States Patent and Trademark Office*